United States Patent
Moore et al.

(10) Patent No.: US 11,526,703 B2
(45) Date of Patent: Dec. 13, 2022

(54) GPU ACCELERATED PERFUSION ESTIMATION FROM MULTISPECTRAL VIDEOS

(71) Applicant: International Business Machines Corporation, Armonk, NY (US)

(72) Inventors: Stephen Michael Moore, Melbourne (AU); Sergiy Zhuk, Dublin (IE); Seshu Tirupathi, Dublin (IE); Michele Gazzetti, Dublin (IE); Pol MacAonghusa, Carbury (IE)

(73) Assignee: International Business Machines Corporation, Armonk, NY (US)

( * ) Notice: Subject to any disclaimer, the term of this patent is extended or adjusted under 35 U.S.C. 154(b) by 197 days.

(21) Appl. No.: 16/940,525

(22) Filed: Jul. 28, 2020

(65) Prior Publication Data

US 2022/0036139 A1 Feb. 3, 2022

(51) Int. Cl.
*G06T 1/20* (2006.01)
*G06K 9/62* (2022.01)
*G06T 7/00* (2017.01)

(52) U.S. Cl.
CPC .............. *G06K 9/6267* (2013.01); *G06T 1/20* (2013.01); *G06T 7/0012* (2013.01); *G06T 2207/10016* (2013.01); *G06T 2207/10064* (2013.01)

(58) Field of Classification Search
CPC ................... G06K 9/6267; G06T 1/20; G06T 2207/10016; G06T 2207/10064; G06T 7/0012; G06V 10/58; G06V 2201/03
See application file for complete search history.

(56) References Cited

U.S. PATENT DOCUMENTS 6,785,409 B1 8/2004 Suri
9,848,843 B2 12/2017 Grass
(Continued)

FOREIGN PATENT DOCUMENTS

WO 2018160963 A1 9/2018

OTHER PUBLICATIONS

Choi et al., "Dynamic Fluorescence Imaging for Multiparametric Measurement of Tumor Vasculature", Journal of Biomedical Optics, Apr. 1, 2011, 16(4), 046008 (2011), pp. 1-6,< https://doi.org/10.1117/1.3562956>.

Gyung et al., "Quantitative analysis of colon perfusion pattern using indocyanine green (ICG) angiography in aparoscopic colorectal surgery", Surgery Endoscopy. 2019;33(5):1640-1649., 11 Pgs,<https://doi:10.1007/s00464-018-6439-y>.

(Continued)

*Primary Examiner* — Tsung Yin Tsai
(74) *Attorney, Agent, or Firm* — Stephanie L. Carusillo

(57) ABSTRACT

In an approach for classifying regions of tissue captured in multispectral videos into medically meaningful classes using GPU accelerated perfusion estimation, a processor receives one or more multispectral videos of a subject tissue of a patient. A processor extracts one or more fluorescence time series profiles from the one or more multispectral videos. A processor estimates one or more sets of perfusion parameters based on the one or more fluorescence time series profiles. A processor inputs one or more feature vectors into a classifier, wherein the one or more feature vectors are derived the one or more sets of perfusion parameters. A processor receives a classification result for each of the one or more feature vectors, wherein the classification result comprises a set of medically relevant labels for each of the one or more feature vectors with a level of certainty for each label of the set of medically relevant labels.

17 Claims, 3 Drawing Sheets

(56) References Cited

U.S. PATENT DOCUMENTS

| | | | |
|---|---|---|---|
| 9,892,513 B2* | 2/2018 | Gurevich | A61B 5/445 |
| 10,783,636 B2* | 9/2020 | Gurevich | A61B 5/0071 |
| 2011/0301447 A1 | 12/2011 | Park | |
| 2016/0157725 A1 | 6/2016 | Munoz | |
| 2016/0253800 A1* | 9/2016 | Gurevich | A61B 5/0071 |
| | | | 382/128 |
| 2016/0346043 A1* | 12/2016 | Jaquet | G06F 3/048 |
| 2017/0084012 A1* | 3/2017 | Walle-Jensen | G16H 50/30 |
| 2017/0084024 A1* | 3/2017 | Gurevich | A61B 5/7239 |
| 2017/0100037 A1* | 4/2017 | Harmelin | A61B 5/0042 |
| 2018/0028079 A1* | 2/2018 | Gurevich | A61B 5/743 |
| 2018/0158187 A1* | 6/2018 | Gurevich | G16H 50/50 |
| 2019/0320875 A1 | 10/2019 | Jones | |
| 2019/0350538 A1* | 11/2019 | Wilson | G06T 5/001 |
| 2021/0065372 A1* | 3/2021 | Zhuk | G06T 7/13 |
| 2022/0036139 A1* | 2/2022 | Moore | G06K 9/6267 |

OTHER PUBLICATIONS

Wang et al., "GPU-accelerated voxelwise hepatic perfusion quantification." Physics Medicine and Biology, 57, (2012), doi:10.1088/0031-9155/57/17/5601, pp. 5601-5616.

Halicek et al., "In-Vivo and Ex-Vivo Tissue Analysis through Hyperspectral Imaging Techniques: Revealing the Invisible Features of Cancer," Cancers, 11, 756, 2019, doi:10.3390/cancers11060756, 30 Pgs, <222.mdpi.com/journal/cancers>.

Wirkert, S, "Multispectral Image Analysis in Laparoscopy—A machine learning approach to live perfusion monitoring." Doctoral Thesis, KIT Faculty of Computer Science of the Karlsruhe Institute of Technology (KIT), Germany, 2018, 160 Pages.

Fawzy et al., "Rapid multispectral endoscopic imaging system for near real-time mapping of the mucosa blood supply in the lung." vol. 6, No. 8, Biomedical Optics Express, 2980, Aug. 1, 2015, DOI:101364/BOE:6.002980, 11 Pgs.

* cited by examiner

GPU ACCELERATED PERFUSION ESTIMATION FROM MULTISPECTRAL VIDEOS

BACKGROUND

The present invention relates generally to the field of classification, and more particularly to classifying regions of tissue captured in multispectral videos into medically meaningful classes using GPU accelerated perfusion estimation.

Fluorescent dyes are used in many medical domains, in which dye is administered to a patient and transported through the body via the blood stream, i.e., perfusion. For example, indocyanine green (ICG) is a cyanine dye that is used in medical diagnostics. ICG is used for determining cardiac output, hepatic function, liver and gastric blood flow, and for ophthalmic angiography. The presence of the dye in a segment of tissue in the patient leads to fluorescence, i.e., if light at a certain wavelength is shone onto the tissue, light at a certain different wavelength is emitted from the tissue. The fluorescence offers a non-invasive way of detecting the presence or absence of dye in tissues of interest.

SUMMARY

Aspects of an embodiment of the present invention disclose a method, computer program product, and computer system for classifying regions of tissue captured in multispectral videos into medically meaningful classes using GPU accelerated perfusion estimation. A processor receives a set of inputs, wherein the set of inputs includes one or more multispectral videos of a subject tissue of a patient. A processor extracts one or more fluorescence time series profiles from the one or more multispectral videos. A processor estimates one or more sets of perfusion parameters based on the one or more fluorescence time series profiles. A processor inputs one or more feature vectors into a classifier, wherein the one or more feature vectors are derived the one or more sets of perfusion parameters. A processor receives a classification result output by the classifier for each of the one or more feature vectors, wherein the classification result comprises a set of medically relevant labels for each of the one or more feature vectors with a level of certainty for each label of the set of medically relevant labels.

In some aspects of an embodiment of the present invention, the one or more multispectral videos is a live stream of a multispectral video of the subject tissue directly from a medical imaging device.

In some aspects of an embodiment of the present invention, the set of inputs further includes patient metadata for the patient.

In some aspects of an embodiment of the present invention, a processor extracts the one or more fluorescence time series profiles in a coordinate system fixed to the patient based on the received one or more multispectral videos of the subject tissue, wherein the coordinate system has time along an x-axis and a fluorescence intensity of the subject tissue along a y-axis.

In some aspects of an embodiment of the present invention, a processor extracts a fluorescence time series profile for each region of the subject tissue.

In some aspects of an embodiment of the present invention, a processor estimates a set of values for each of the one or more sets of perfusion parameters for each fluorescence time series profile of the one or more fluorescence time series profiles.

In some aspects of an embodiment of the present invention, a processor estimates the one or more sets of perfusion parameters for advection-diffusion equation based on the one or more fluorescence time series profiles.

In some aspects of an embodiment of the present invention, a processor estimates the one or more sets of perfusion parameters for advection-diffusion equation based on the one or more fluorescence time series profiles using a scalar transport equation, $\partial\_t\ u + \partial\_(x\_i)(A\_i\ u) = \partial\_(x\_i)(D\partial\_(x\_i) u) + S$, wherein a spatiotemporal fluorescence intensity $u(x,t)$ of the one or more fluorescence time series profiles can be modelled in terms of a spatially varying advective velocity field $A(x)$ and diffusive scalar field $D(x)$, wherein the advective velocity field and the diffusive scalar field are perfusion parameters of the one or more sets of perfusion parameters.

In some aspects of an embodiment of the present invention, a processor solves a boundary value problem (BVP) system to produce the set of values for each of the one or more sets of perfusion parameters, wherein the BVP system is partitioned to one or more graphics processing units (GPUs) to execute portions of the BVP system.

In some aspects of an embodiment of the present invention, each of the one or more feature vectors are derived from one of the one or more sets of perfusion parameters and the patient metadata.

DETAILED DESCRIPTION

Figure 1:
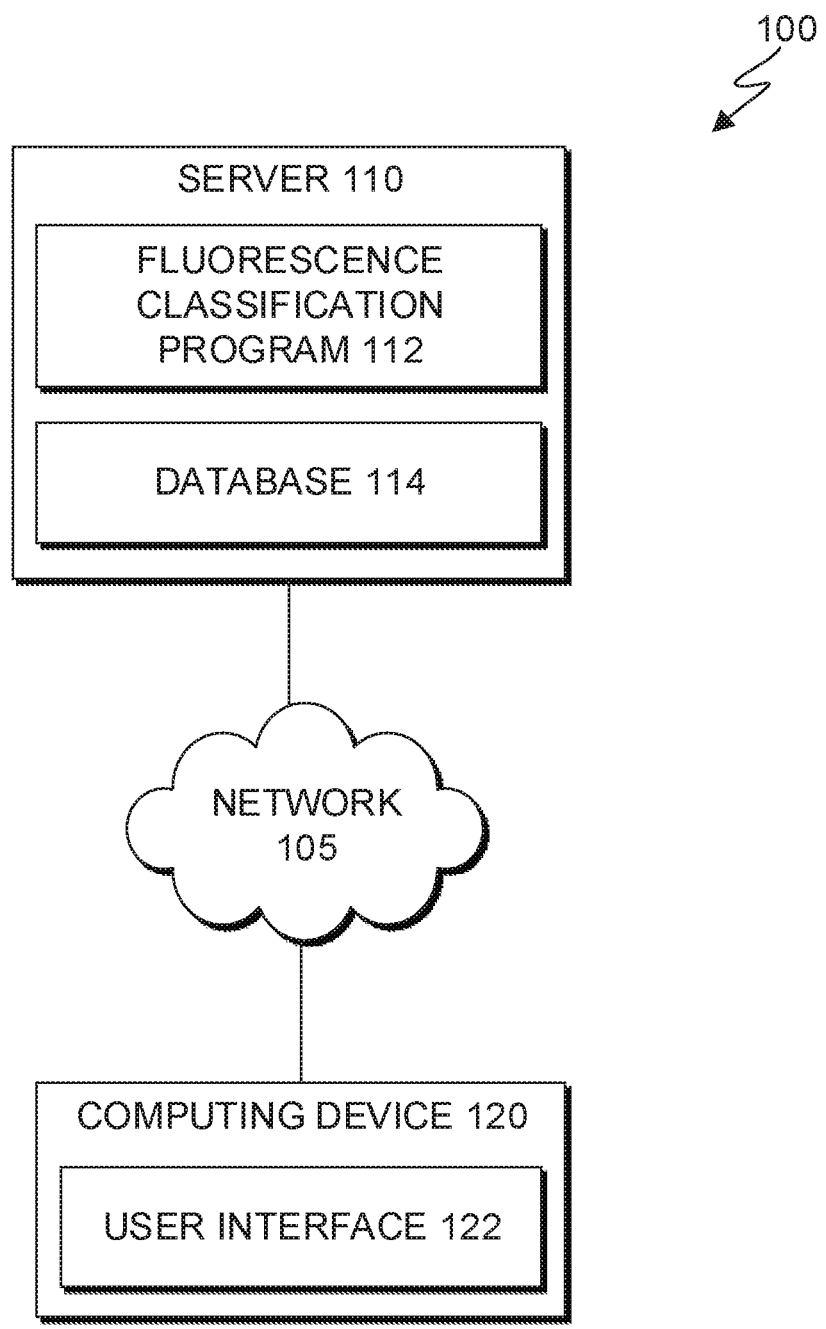
FIG. 1 depicts a block diagram of a distributed data processing environment, in accordance with an embodiment of the present invention.

Embodiments of the present invention recognize that fluorescent dyes are used in many medical domains, in which dye is administered to a patient and transported through the body via the blood stream, i.e., perfusion, to body tissue. As the fluorescent dye perfuses the tissue, the dye remains bound to plasma proteins and confined to the vascular system of the body. The presence of the dye in a segment of tissue in the patient leads to fluorescence, i.e., if light at a certain wavelength is shone onto the tissue, light at a certain different wavelength is emitted from the tissue. The fluorescence offers a non-invasive way of detecting the presence or absence of dye in tissues of interest. A medical expert assesses an increase or decrease in fluorescence intensity, e.g., cancerous tissue retains dye much longer than healthy tissue, but this assessment can be subjective and qualitative. Additionally, it can be challenging to keep track of the fluorescence intensity of several regions. Embodiments of the present invention recognize the need for an objective, quantitative way of extracting information contained in fluorescent profiles that would inform the decision making of medical experts, improve individual decision making by giving access to decision making of the expert community, and enable semi-automation of surgical intervention.

For example, in colorectal surgery, the assessment of suspicious growths has several aspects. During a colonoscopy, a fluorescent dye, e.g., indocyanine green (ICG), is administered. Along with inspecting any growth and surrounding tissue, a medical professional observes the fluorescence of the tissue, particularly where the fluorescence persists longer than 20 minutes, and takes biopsy samples that are sent to pathology to be analyzed. During the surgery, the medical professional is guided by their subjective and qualitative assessment of the appearance and fluorescence of the tissue.

Embodiments of the present invention provide a system and method for classifying regions of tissue captured in multispectral videos into medically meaningful classes using graphics processing unit (GPU) accelerated perfusion estimation, in accordance with an embodiment of the present invention. Embodiments of the present invention employ real-time tracking of regions of tissue in multispectral videos, model(s) of perfusion dynamics, and algorithms to invert bio-physical models of dye transport and fluorescence in tissue. Embodiments of the present invention utilize fluorescence profile extraction, physical parametrization, and classification to transform multispectral videos from a medical imaging device along with patient metadata and a historical corpus of multispectral videos with labelled tissues into a classification result of medically relevant labels either per region or spatially distributed and a measure of certainty for each label.

Embodiments of the present invention employ a specialized multi-GPU system for performing the physical parameterization, which involves solving a Boundary Value Problem (BVP) system that can be a computationally intensive task. To decrease the time required for the BVP system resolution, embodiments of the present invention partition the BVP system across one or more GPUs to execute portions of the matrix vector products, vector updates, and inner products. Embodiments of the present invention employ either a GPU accelerated cloud service or a local computation infrastructure for a multi-GPU system.

Referring back to the colorectal surgery example, embodiments of the present invention can be employed to perform a live classification during a colorectal surgery that can be used to provide a diagnosis in minutes compared to multiple days of processing time for conventional pathology. Embodiments of the present invention can receive a live stream of multispectral video of a subject tissue in which a fluorescent dye has been administered from a medical imaging device, extract a fluorescence time series profile for a set of regions of the subject tissue, perform a perfusion parameter estimation using a multi-GPU system, and perform a classification of the subject tissue as "cancer", healthy", or "benign" with a level of certainty for each that can be output to the medical professionals performing the surgery. This entire process can be completed in minutes to provide a diagnosis further directing the medical professionals on actions to take during the surgery.

The present invention may contain various accessible data sources, such as server 110 and computing device 120, that may include personal data, content, or information the user wishes not to be processed. Personal data includes personally identifying information or sensitive personal information as well as user information, such as height, weight etc. Processing refers to any, automated or unautomated, operation or set of operations such as collection, recording, organization, structuring, storage, adaptation, alteration, retrieval, consultation, use, disclosure by transmission, dissemination, or otherwise making available, combination, restriction, erasure, or destruction performed on personal data. Fluorescence classification program 112 enables the authorized and secure processing of personal data. Fluorescence classification program 112 provides informed consent, with notice of the collection of personal data, allowing the user to opt in or opt out of processing personal data.

Consent by a user can take several forms. Opt-in consent can impose on the user to take an affirmative action before personal data is processed. Alternatively, opt-out consent can impose on the user to take an affirmative action to prevent the processing of personal data before personal data is processed. Fluorescence classification program 112 provides information regarding personal data and the nature (e.g., type, scope, purpose, duration, etc.) of the processing. Fluorescence classification program 112 provides the user with copies of stored personal data. Fluorescence classification program 112 allows the correction or completion of incorrect or incomplete personal data. Fluorescence classification program 112 allows the immediate deletion of personal data.

The present invention will now be described in detail with reference to the Figures.

FIG. 1 depicts a functional block diagram illustrating distributed data processing environment 100, in accordance with an embodiment of the present invention. The term "distributed" as used herein describes a computer system that includes multiple, physically distinct devices that operate together as a single computer system. FIG. 1 provides only an illustration of one embodiment of the present invention and does not imply any limitations with regard to the environments in which different embodiments may be implemented. Many modifications to the depicted environment may be made by those skilled in the art without departing from the scope of the invention as recited by the claims.

In the depicted embodiment, distributed data processing environment 100 includes server 110 and computing device 120 interconnected over network 105. In an embodiment, distributed data processing environment 100 represents a system that performs GPU accelerated perfusion estimation from regions of tissue captured in multispectral video stream(s) and classifies fluorescence profiles into medically meaningful classes. Network 105 can be, for example, a local area network (LAN), a wide area network (WAN) such as the Internet, or a combination of the two, and can include wired, wireless, or fiber optic connections. Network 105 can include one or more wired and/or wireless networks that are capable of receiving and transmitting data, voice, and/or video signals, including multimedia signals that include voice, data, and video information. In general, network 105 can be any combination of connections and protocols that will support communications between server 110 and computing device 120. Distributed data processing environment 100 may include additional servers, computers, or other devices not shown.

Server 110 operates to run fluorescence classification program 112 and manage database 114. In the depicted embodiment, server 110 contains fluorescence classification program 112 and database 114. In some embodiments, server 110 can be a standalone computing device, a management server, a web server, or any other electronic device or computing system capable of receiving, sending, and processing data and capable of communicating with computing device 120 via network 105. In other embodiments, server 110 represents a server computing system utilizing multiple computers as a server system, such as a cloud computing environment. In yet other embodiments, server 110 represents a computing system utilizing clustered computers and components (e.g., database server computers, application server computers, etc.) that act as a single pool of seamless resources when accessed within distributed data processing environment 100. Server 110 may include components as described in further detail in FIG. 3.

Fluorescence classification program 112 operates to perform GPU accelerated perfusion estimation from regions of tissue captured in multispectral video stream(s) and classify fluorescence profiles into medically meaningful classes. In the depicted embodiment, fluorescence classification program 112 resides on server 110 with user interface 122 being a local app interface of fluorescence classification program 112 running on computing device 120. In other embodiments, fluorescence classification program 112 may be run locally on computing device 120 or on another device (not shown) provided that fluorescence classification program 112 has access to network 105. In yet other embodiments, certain steps of fluorescence classification program 112 can be run on server 110 and other steps fluorescence classification program 112 can be run on computing device 120 provided that fluorescence classification program 112 has access to network 105 to exchange information between server 110 and computing device 120. Fluorescence classification program 112 is described in more detail below with reference to FIG. 2.

Database 114 operates as a repository for data received, used, and/or output by fluorescence classification program 112. Data received, used, and/or generated may include, but is not limited to, multispectral videos from a medical imaging device; fluorescence time series profiles extracted; classification outputs of medically relevant labels and level of certainty for each; and any other data received, used, and/or output by fluorescence classification program 112. Database 114 can be implemented with any type of storage device capable of storing data and configuration files that can be accessed and utilized by server 110, such as a hard disk drive, a database server, or a flash memory. In an embodiment, database 114 is accessed by server 110, fluorescence classification program 112, and/or computing device 120 to store and/or to access the data. In the depicted embodiment, database 114 resides on server 110. In another embodiment, database 114 may reside on another computing device, server, cloud server, or spread across multiple devices elsewhere (not shown) within distributed data processing environment 100, provided that database 114 has access to network 105.

Computing device 120 operates as a computing device that can send and receive data through a user interface. In some embodiments, computing device 120 may be, but is not limited to, an electronic device, such as a laptop computer, a tablet computer, a netbook computer, a personal computer (PC), a desktop computer, a smart phone, a wearable computing device, or any programmable electronic device capable of running user interface 122 and communicating (i.e., sending and receiving data) with server 110 and/or fluorescence classification program 112 via network 105. In some embodiments, computing device 120 represents one or more programmable electronic devices or combination of programmable electronic devices capable of executing machine readable program instructions and communicating with server 110 and/or other computing devices within distributed data processing environment 100 via a network, such as network 105. In an embodiment, computing device 120 represents one or more devices associated with one or more users. In the depicted embodiment, computing device 120 includes an instance of user interface 122. Computing device 120 may include components as described in further detail in FIG. 3.

User interface 122 operates as a local user interface on computing device 120 through which one or more users of computing device 120 interact with computing device 120. In some embodiments, user interface 122 is a local app interface of fluorescence classification program 112 on computing device 120. In some embodiments, user interface 122 is a graphical user interface (GUI), a web user interface (WUI), and/or a voice user interface (VUI) that can display (i.e., visually), present (i.e., audibly), and/or enable a user to enter or receive information (i.e., graphics, text, and/or sound) for or from fluorescence classification program 112 via network 105. In an embodiment, user interface 122 enables a user to send and receive data (i.e., to and from fluorescence classification program 112 via network 105, respectively). In an embodiment, user interface 122 enables a user to input a set of multispectral videos and/or view an output of classification result of labels with level of certainty for each label.

Figure 2:
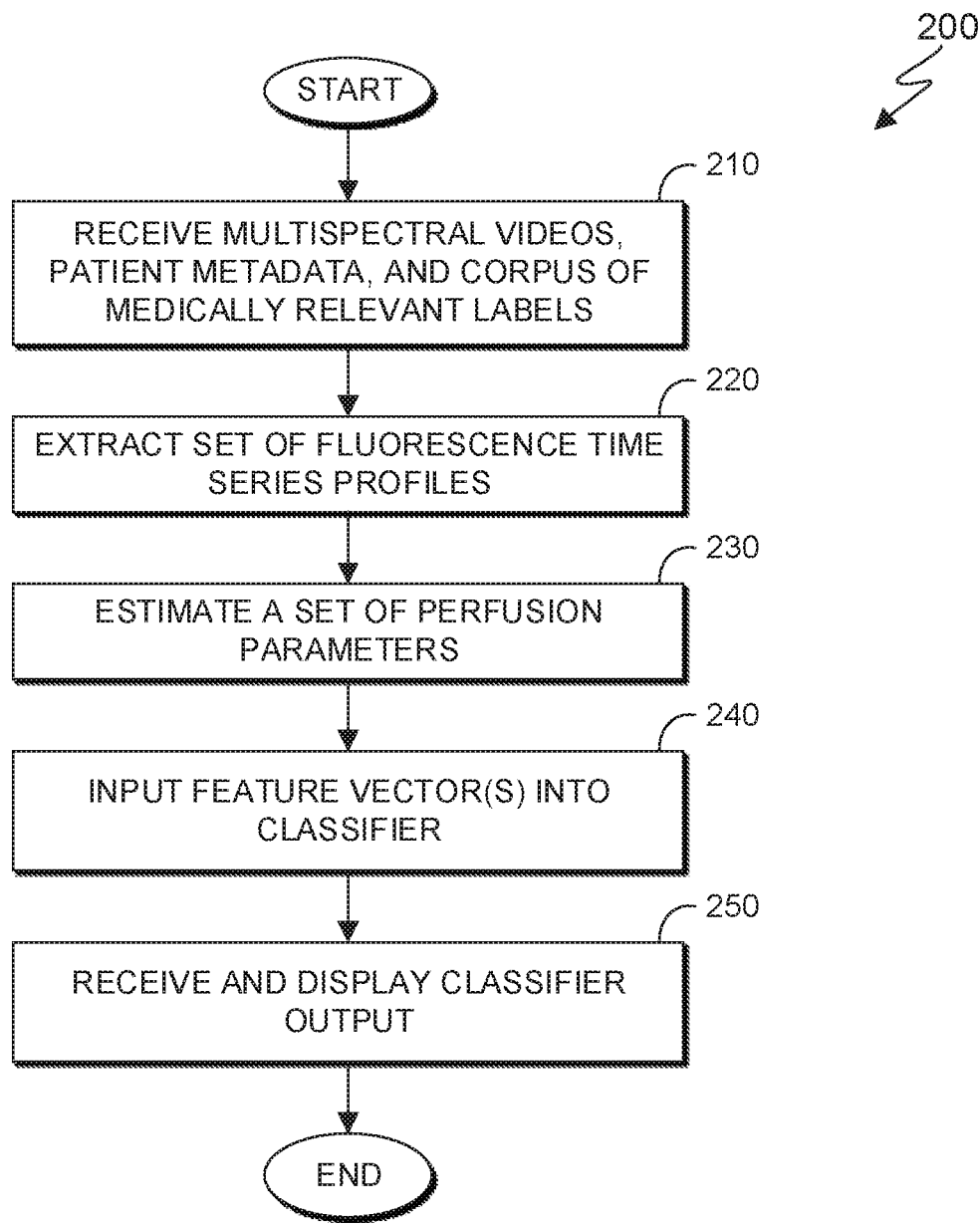
FIG. 2 depicts a flowchart of the steps of a fluorescence classification program, for classifying regions of tissue captured in multispectral videos into medically meaningful classes using GPU accelerated perfusion estimation, in accordance with an embodiment of the present invention.

FIG. 2 depicts a flowchart 200 of the steps of fluorescence classification program 112, for classifying regions of tissue captured in multispectral videos into medically meaningful classes using GPU accelerated perfusion estimation, in accordance with an embodiment of the present invention. In an embodiment, fluorescence classification program 112 receives a set of inputs, extracts one or more fluorescence time series profiles, estimates one or more sets of perfusion parameters, inputs one or more feature vector(s) derived from the set of perfusion parameters into a classifier, and receives a classification result output by the classifier for each of the one or more feature vectors of medically relevant labels with a level of certainty for each label. It should be appreciated that the process depicted in FIG. 2 illustrates one possible iteration of fluorescence classification program 112 that may be repeated to initially train the classifier and then to apply the trained classifier to each new set of inputs.

In step 210, fluorescence classification program 112 receives a set of inputs. In an embodiment, fluorescence classification program 112 receives one or more multispectral videos of a subject tissue from a medical imaging device and/or from a database, e.g., database 114. In an embodiment, fluorescence classification program 112 receives a live stream of a multispectral video of a subject tissue after a fluorescent dye has been administered, in which the live stream of the multispectral video is received directly from a medical imaging device. In an embodiment, fluorescence classification program 112 receives patient metadata for the patient of the subject tissue including, but not limited to, age, prior conditions, blood pressure, pulse rate, etc. from a database, e.g., database 114, and/or input by a user via a user interface, e.g., user interface 122 of computing device 120. In an embodiment, fluorescence classification program 112 receives a set of historical multispectral videos that are labeled with medically relevant labels, i.e., associated pathology findings, from a database, e.g., database 114. In some embodiments, fluorescence classification program 112 receives a corpus of medically relevant labels to be used later during classification. In some embodiments, fluorescence classification program 112 receives a set of inputs including the one or more multispectral videos, the patient metadata, and the set of historical, labeled multispectral videos.

In step 220, fluorescence classification program 112 extracts one or more fluorescence time series profiles. In an embodiment, responsive to fluorescence classification program 112 receiving the set of inputs, fluorescence classification program 112 extracts one or more fluorescence time series profiles. In an embodiment, fluorescence classification program 112 extracts one or more fluorescence time series profiles in a coordinate system fixed to the patient based on the received one or more multispectral videos of the subject tissue. The coordinate system is fixed to the patient by real-time tracking of camera and tissue movement in the one or more multispectral videos. In an embodiment, fluorescence classification program 112 extracts one or more fluorescence time series profiles in a coordinate system with time along an x-axis and aggregated pixel intensity, i.e., the fluorescence intensity of the subject tissue, along a y-axis. In an embodiment, fluorescence classification program 112 extracts one or more fluorescence time series profiles per region of the subject tissue or per point in space of the subject tissue, i.e., spatially distributed, in which each time series profile represents a region or a point in space.

In step 230, fluorescence classification program 112 estimates one or more sets of perfusion parameters. In an embodiment, responsive to fluorescence classification program 112 extracting one or more fluorescence time series profiles, fluorescence classification program 112 estimates one or more sets of perfusion parameters. In an embodiment, fluorescence classification program 112 performs physical parameterization to estimate a set of values for one or more sets of perfusion parameters to be used subsequently during classification. In an embodiment, fluorescence classification program 112 estimates a set of values for one or more sets of perfusion parameters based on the one or more fluorescence time series profiles generated in the previous step. In an embodiment, fluorescence classification program 112 estimates a set of values for one or more sets of perfusion parameters either per time series, i.e., for each time series individually, in which multiple sets of perfusion parameters would be estimated, or jointly with interactions between time series taken into account, in which one set of perfusion parameters would be estimated.

In an embodiment, fluorescence classification program 112 performs physical parameterization to estimate one or more sets of perfusion parameters using partial differential equations, e.g., advection-diffusion equation or reaction-diffusion equation. The perfusion parameters to be estimated by fluorescence classification program 112 that are used for the classification algorithms of the classifier in a subsequent step will depend on the choice of the partial differential equation and its corresponding coefficients. For example, advection diffusion equation would have the advective field and diffusion coefficients which are used directly or in a modified form for the classification algorithm. In another example, if a photon-diffusion equation is used, the parameters would be diffusion and reaction coefficients. In an embodiment, fluorescence classification program 112 enables a user of computing device 120 to input which partial differential equation to be used.

In an embodiment in which the advection diffusion equation is selected, fluorescence classification program 112 performs physical parameterization using a scalar transport equation, in which spatiotemporal fluorescence intensity $u(x,t)$ can be modelled in terms of a spatially varying advective velocity field $A(x)$ and diffusive scalar field $D(x)$. The scalar transport equation is shown as equation (1) with the spatially varying advective velocity field $A(x)$ and diffusive scalar field $D(x)$ being the perfusion parameters that fluorescence classification program 112 estimates a set of values for to be used in the subsequent classification step.

In an embodiment, fluorescence classification program 112 solves a BVP system, i.e., inversion problem, to produce values for the spatially varying advective velocity field $A(x)$ and diffusive scalar field $D(x)$ parameters. In an embodiment, fluorescence classification program 112 solves the BVP system using a multi-GPU system, in which the BVP system is partitioned to one or more GPUs to execute portions of the BVP system. In an embodiment, fluorescence classification program 112 derives feature vector(s) from the set of perfusion parameters estimated. The perfusion parameters estimated in the step 230 along with the patient metadata input in step 210 constitute the feature vector of each time series extracted in step 220.

In step 240, fluorescence classification program 112 inputs one or more feature vectors derived from the set of perfusion parameters into a classifier. In an embodiment, responsive to fluorescence classification program 112 estimating the one or more sets of perfusion parameters, fluorescence classification program 112 inputs one or more feature vectors into a classifier. In an embodiment, fluorescence classification program 112 inputs one or more feature vectors into a classifier, e.g., random forest classifier, to train the classifier, re-train the classifier, or apply the trained classifier to the input feature vectors. In an embodiment, for training the classifier, fluorescence classification program 112 inputs the set of historical multispectral videos that are labeled with a corpus of medically relevant labels into the classifier.

In step 250, fluorescence classification program 112 receives classification result(s) output by the classifier. In an embodiment, responsive to fluorescence classification program 112 inputs one or more feature vectors into the classifier, fluorescence classification program 112 receives classification result(s) output by the classifier. In an embodiment, fluorescence classification program 112 receives a classification result for each feature vector of the one or more feature vectors input into the classifier, and in which the classification result includes medically relevant label(s) for the subject tissue and a level of certainty for each label. In some embodiments, fluorescence classification program 112 receives a classification result for the one feature vector input into the classifier, in which the feature vector constituted the set of time series considered jointly. In other embodiments, fluorescence classification program 112 receives a classification result for each feature vector input into the classifier, in which each feature vector constituted each time series. In some embodiments, fluorescence classification program 112 outputs the classification result(s) to display or present through a user interface of a computing device to one or more users, e.g., through user interface 122 of computing device 120.

An example of a classification result received by fluorescence classification program 112, in which there were two feature vectors or regions of subject tissue, is "Region 1: [Cancer: 0.9, Healthy: 0.02, Benign: 0.09] and Region 2: [Cancer: 0.07, Healthy: 0.68, Benign: 0.25]", in which "Cancer", "Healthy", and "Benign" are the medically meaningful labels and the level of certainty for each is shown as a value between zero (0) and one (1) with one (1) being certain and zero (0) being uncertain.

Figure 3:
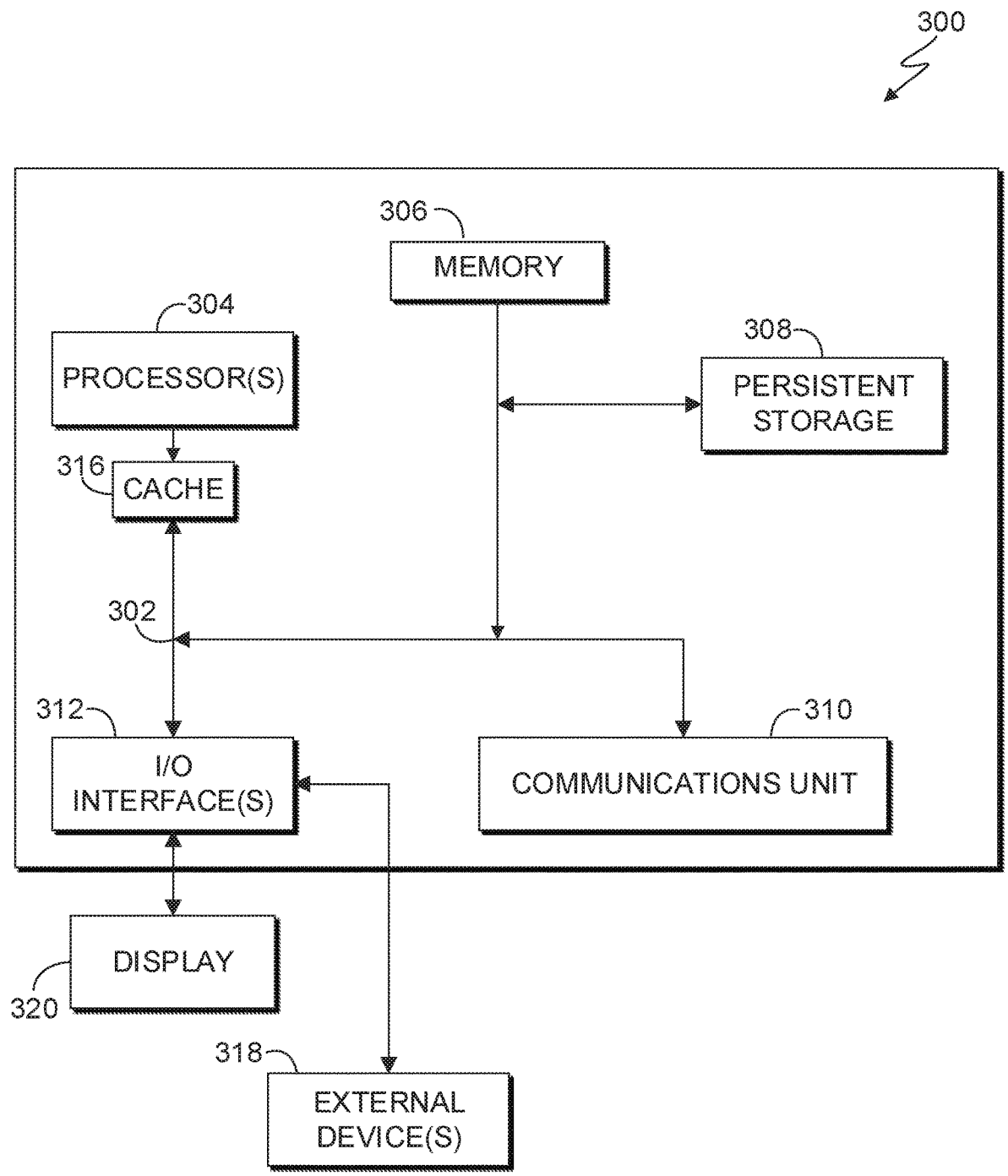
FIG. 3 depicts a block diagram of a computing device of the distributed data processing environment, in accordance with an embodiment of the present invention.

FIG. 3 depicts a block diagram of components of computing device 300 suitable for server 110 and/or computing device 120 in accordance with an illustrative embodiment of the present invention. It should be appreciated that FIG. 3 provides only an illustration of one implementation and does not imply any limitations with regard to the environments in $$\partial_t u + \partial_{x_i}(A_i u) = \partial_{x_i}(D \partial_{x_i} u) + S \qquad (1)$$

which different embodiments may be implemented. Many modifications to the depicted environment may be made.

Computing device 300 includes communications fabric 302, which provides communications between cache 316, memory 306, persistent storage 308, communications unit 310, and input/output (I/O) interface(s) 312. Communications fabric 302 can be implemented with any architecture designed for passing data and/or control information between processors (such as microprocessors, communications and network processors, etc.), system memory, peripheral devices, and any other hardware components within a system. For example, communications fabric 302 can be implemented with one or more buses or a crossbar switch.

Memory 306 and persistent storage 308 are computer readable storage media. In this embodiment, memory 306 includes random access memory (RAM). In general, memory 306 can include any suitable volatile or non-volatile computer readable storage media. Cache 316 is a fast memory that enhances the performance of computer processor(s) 304 by holding recently accessed data, and data near accessed data, from memory 306.

Programs may be stored in persistent storage 308 and in memory 306 for execution and/or access by one or more of the respective computer processors 304 via cache 316. In an embodiment, persistent storage 308 includes a magnetic hard disk drive. Alternatively, or in addition to a magnetic hard disk drive, persistent storage 308 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 308 may also be removable. For example, a removable hard drive may be used for persistent storage 308. Other examples include optical and magnetic disks, thumb drives, and smart cards that are inserted into a drive for transfer onto another computer readable storage medium that is also part of persistent storage 308.

Communications unit 310, in these examples, provides for communications with other data processing systems or devices. In these examples, communications unit 310 includes one or more network interface cards. Communications unit 310 may provide communications through the use of either or both physical and wireless communications links. Programs may be downloaded to persistent storage 308 through communications unit 310.

I/O interface(s) 312 allows for input and output of data with other devices that may be connected to server 110 and/or computing device 120. For example, I/O interface 312 may provide a connection to external devices 318 such as a keyboard, keypad, a touch screen, and/or some other suitable input device. External devices 318 can also include portable computer readable storage media such as, for example, thumb drives, portable optical or magnetic disks, and memory cards. Software and data used to practice embodiments of the present invention can be stored on such portable computer readable storage media and can be loaded onto persistent storage 308 via I/O interface(s) 312. I/O interface(s) 312 also connect to a display 320.

Display 320 provides a mechanism to display data to a user and may be, for example, a computer monitor.

Programs described herein is identified based upon the application for which it is implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method comprising:
   receiving, by one or more processors, a set of inputs, wherein the set of inputs includes one or more multispectral videos of a subject tissue of a patient;
   extracting, by the one or more processors, one or more fluorescence time series profiles from the one or more multispectral videos;
   estimating, by the one or more processors, one or more sets of perfusion parameters for advection-diffusion equation based on the one or more fluorescence time series profiles using a scalar transport equation, $\partial_t u + \partial_{x_i}(A_i u) = \partial_{x_i}(D \partial_{x_i} u) + S$, wherein a spatiotemporal fluorescence intensity $u(x,t)$ of the one or more fluorescence time series profiles can be modelled in terms of a spatially varying advective velocity field $A(x)$ and diffusive scalar field $D(x)$, wherein the advective velocity field and the diffusive scalar field are perfusion parameters of the one or more sets of perfusion parameters;
   inputting, by the one or more processors, one or more feature vectors into a classifier, wherein the one or more feature vectors are derived the one or more sets of perfusion parameters; and
   receiving, by the one or more processors, a classification result output by the classifier for each of the one or more feature vectors, wherein the classification result comprises a set of medically relevant labels for each of the one or more feature vectors with a level of certainty for each label of the set of medically relevant labels.

2. The computer-implemented method of claim 1, wherein the one or more multispectral videos is a live stream of a multispectral video of the subject tissue directly from a medical imaging device.

3. The computer-implemented method of claim 1, wherein the set of inputs further includes patient metadata for the patient.

4. The computer-implemented method of claim 3, wherein each of the one or more feature vectors are derived from one of the one or more sets of perfusion parameters and the patient metadata.

5. The computer-implemented method of claim 1, wherein extracting the one or more fluorescence time series profiles from the one or more multispectral videos comprises:
   extracting, by the one or more processors, the one or more fluorescence time series profiles in a coordinate system fixed to the patient based on the received one or more multispectral videos of the subject tissue, wherein the coordinate system has time along an x-axis and a fluorescence intensity of the subject tissue along a y-axis.

6. The computer-implemented method of claim 1, wherein extracting the one or more fluorescence time series profiles from the one or more multispectral videos comprises:
   extracting, by the one or more processors, a fluorescence time series profile for each region of the subject tissue.

7. The computer-implemented method of claim 1, wherein estimating the one or more sets of perfusion parameters based on the one or more fluorescence time series profiles comprises:
  estimating, by the one or more processors, a set of values for each of the one or more sets of perfusion parameters for each fluorescence time series profile of the one or more fluorescence time series profiles.

8. The computer-implemented method of claim 1, wherein estimating the one or more sets of perfusion parameters based on the one or more fluorescence time series profiles comprises:
  estimating, by the one or more processors, the one or more sets of perfusion parameters for a pre-defined partial differential equation based on the one or more fluorescence time series profiles.

9. The computer-implemented method of claim 1, further comprising:
  solving, by the one or more processors, a boundary value problem (BVP) system to produce the set of values for each of the one or more sets of perfusion parameters, wherein the BVP system is partitioned to one or more graphics processing units (GPUs) to execute portions of the BVP system.

10. A computer program product comprising:
  one or more computer readable tangible storage device and program instructions stored on the one or more computer readable tangible storage device, the program instructions comprising:
  program instructions to receive a set of inputs, wherein the set of inputs includes one or more multispectral videos of a subject tissue of a patient;
  program instructions to extract one or more fluorescence time series profiles from the one or more multispectral videos;
  program instructions to estimate one or more sets of perfusion parameters for advection-diffusion equation based on the one or more fluorescence time series profiles using a scalar transport equation, using a scalar transport equation, $\partial_t u + \partial_{x_i}(A_i u) = \partial_{x_i}(D \partial_{x_i} u) + S$, wherein a spatiotemporal fluorescence intensity $u(x,t)$ of the one or more fluorescence time series profiles can be modelled in terms of a spatially varying advective velocity field $A(x)$ and diffusive scalar field $D(x)$, wherein the advective velocity field and the diffusive scalar field are perfusion parameters of the one or more sets of perfusion parameters;
  program instructions to input one or more feature vectors into a classifier, wherein the one or more feature vectors are derived the one or more sets of perfusion parameters; and
  program instructions to receive a classification result output by the classifier for each of the one or more feature vectors, wherein the classification result comprises a set of medically relevant labels for each of the one or more feature vectors with a level of certainty for each label of the set of medically relevant labels.

11. The computer program product of claim 10, wherein the program instructions to extract the one or more fluorescence time series profiles from the one or more multispectral videos comprise:
  program instructions to extract the one or more fluorescence time series profiles in a coordinate system fixed to the patient based on the received one or more multispectral videos of the subject tissue, wherein the coordinate system has time along an x-axis and a fluorescence intensity of the subject tissue along a y-axis.

12. The computer program product of claim 10, wherein the program instructions to estimate the one or more sets of perfusion parameters based on the one or more fluorescence time series profiles comprise:
  program instructions to estimate the one or more sets of perfusion parameters for a pre-defined partial differential equation based on the one or more fluorescence time series profiles.

13. The computer program product of claim 10, further comprising:
  program instructions to solve a boundary value problem (BVP) system to produce the set of values for each of the one or more sets of perfusion parameters, wherein the BVP system is partitioned to one or more graphics processing units (GPUs) to execute portions of the BVP system.

14. A computer system comprising:
  one or more computer processors;
  one or more computer readable storage media;
  program instructions stored on the computer readable storage media for execution by at least one of the one or more processors, the program instructions comprising:
  program instructions to program instructions to receive a set of inputs, wherein the set of inputs includes one or more multispectral videos of a subject tissue of a patient;
  program instructions to extract one or more fluorescence time series profiles from the one or more multispectral videos;
  program instructions to estimate one or more sets of perfusion parameters for advection-diffusion equation based on the one or more fluorescence time series profiles using a scalar transport equation, $\partial_t u + \partial_{x_i}(A_i u) = \partial_{x_i}(D \partial_{x_i} u) + S$, wherein a spatiotemporal fluorescence intensity $u(x,t)$ of the one or more fluorescence time series profiles can be modelled in terms of a spatially varying advective velocity field $A(x)$ and diffusive scalar field $D(x)$, wherein the advective velocity field and the diffusive scalar field are perfusion parameters of the one or more sets of perfusion parameters;
  program instructions to input one or more feature vectors into a classifier, wherein the one or more feature vectors are derived the one or more sets of perfusion parameters; and
  program instructions to receive a classification result output by the classifier for each of the one or more feature vectors, wherein the classification result comprises a set of medically relevant labels for each of the one or more feature vectors with a level of certainty for each label of the set of medically relevant labels.

15. The computer system of claim 14, wherein the program instructions to extract the one or more fluorescence time series profiles from the one or more multispectral videos comprise:
  program instructions to extract the one or more fluorescence time series profiles in a coordinate system fixed to the patient based on the received one or more multispectral videos of the subject tissue, wherein the coordinate system has time along an x-axis and a fluorescence intensity of the subject tissue along a y-axis.

16. The computer system of claim 14, wherein the program instructions to estimate the one or more sets of perfusion parameters based on the one or more fluorescence time series profiles comprise:
   program instructions to estimate the one or more sets of perfusion parameters for a pre-defined partial differential equation based on the one or more fluorescence time series profiles.

17. The computer system of claim 16, further comprising:
   program instructions to solve a boundary value problem (BVP) system to produce the set of values for each of the one or more sets of perfusion parameters, wherein the BVP system is partitioned to one or more graphics processing units (GPUs) to execute portions of the BVP system.

* * * * *